United States Patent
Kersten

[15] 3,662,077
[45] May 9, 1972

[54] EDUCATIONAL DEVICE

[72] Inventor: Emile V. Kersten, P.O. Box 202, Avondale, Colo. 81022

[22] Filed: Aug. 5, 1970

[21] Appl. No.: 61,072

[52] U.S. Cl. .............................................................35/37
[51] Int. Cl. .....................................................G09b 11/04
[58] Field of Search................................................35/37, 66

[56] References Cited

FOREIGN PATENTS OR APPLICATIONS 1,136,402   12/1968   Great Britain............................35/37

*Primary Examiner*—Wm. H. Grieb
*Attorney*—John A. Young

[57] ABSTRACT

A device for teaching children writing skills. A housing having a top provided with a visible letter of the alphabet, a starter button which must be depressed by the right hand or the left hand of the child during operation and an object or symbol representing the letter being written which is illuminated upon successful completion of the tracing of the letter. A magnetic pencil with which the child follows or traces the letter indicia on the top, a steel ball which follows the course of the magnetic pencil in tracing the particular letter. A source of current, an electric circuit and an electric switch positioned at the end of the letter and closed by the magnetic ball when the ball reaches this point to thereby illuminate the object or symbol upon successful completion of tracing the letter. The attraction of the ball by the magnetic pencil is lost if the child tracing the letter indicia lets the pencil deviate from said letter indicia, if this occurs the ball will fall into a collection box to return to letter starting position for a further attempt at proper tracing by the learner.

7 Claims, 8 Drawing Figures

PATENTED MAY 9 1972
3,662,077
SHEET 1 OF 2
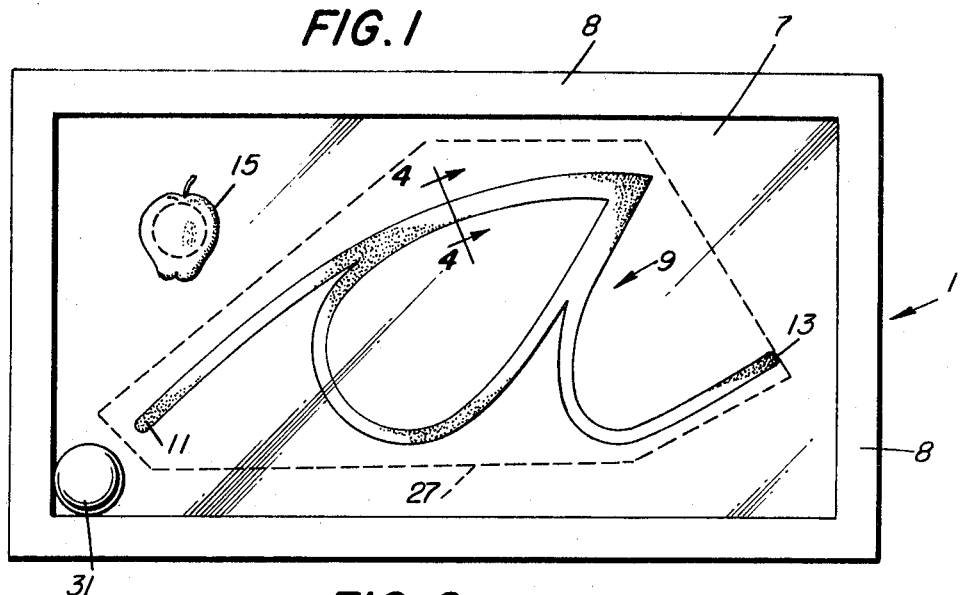
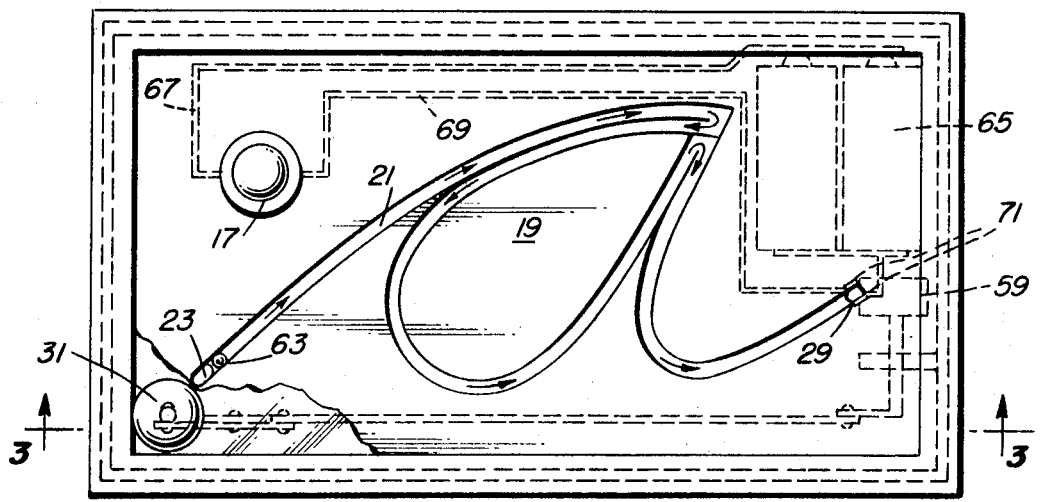
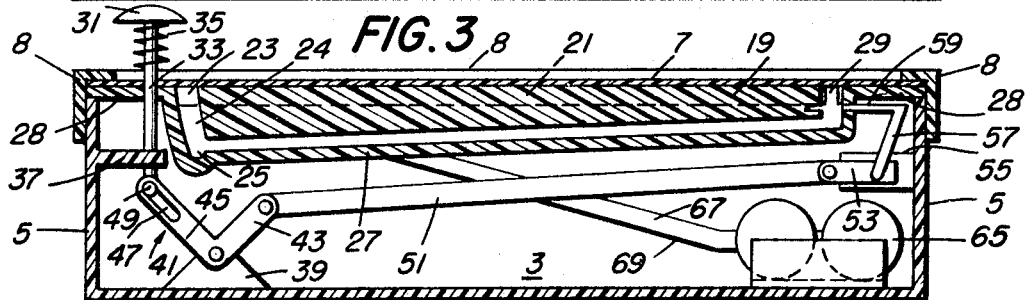
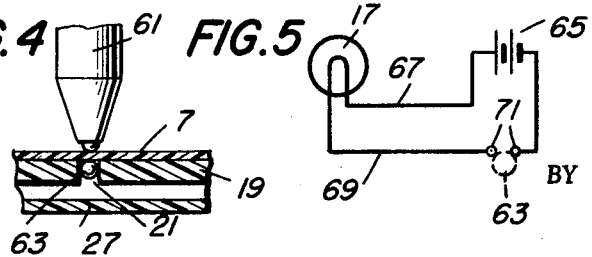
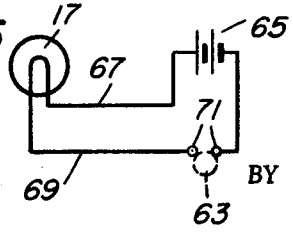
INVENTOR
Emile V. Kersten
Pech & Pech
ATTORNEY

PATENTED MAY 9 1972 3,662,077

INVENTOR
EMILE V. KERSTEN
BY Peck & Peck
ATTORNEYS

EDUCATIONAL DEVICE

This invention relates broadly to the educational arts, and in its more specific aspects it comprises an educational device for teaching children to write letters of the alphabet, and the like, and involves mechanism whereby the learning child's interest in successfully completing and learning letters is sustained; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

In the development of this invention I have endeavored to provide a device for the above mentioned purposes, which will be described in detail hereinafter, which makes learning to write and read as easy and interesting as playing a game. The educational device which I have evolved introduces, into the learning procedure, a degree of excitement to the child, since upon successful completion of the writing of the particular letter, or indicia, certain events occur which please and increase the mental acquisitiveness of the child being instructed.

Field tests have been conducted using this device upon children from 4-6 years of age and the results of these tests indicate that children of this age level handle with facility the muscular movement which is required to successfully complete the tracing of a letter, or other indicia, which appears on the device. These field tests also unequivocally show that not only does my device teach a child to write a letter, or the like, but also indicate that the learner at this age conceptualizes the letter of other indicia which he is tracing.

It is the current thought among professional educators in the discipline of child development, that printing rather than writing develops many habits in the child which must be abandoned when the child begins developing writing skills. While I have disclosed, as one example from many, the teaching and conceptualizing of the writing of letters of the alphabet, it is to be distinctly understood that it is within my contemplation to utilize my device for tracing other indicia than the letters of the alphabet in this ingenious teaching method and apparatus.

One of the significant characteristics of my invention resides in the provision therein of a reinforcement technique whereby the learning child will be aware of whether he is performing his task successfully. Upon the successful completion of the tracing of, for instance, a letter of the alphabet, a signal is automatically energized to indicate such successful completion.

It has long been the view of professionals working in child development, and of the inventor, that right handed writers can be developed from left handed children if the left hand is occupied during the learning procedure. In order to provide an arrangement whereby the learner will be forced to use his right hand rather than his left hand in the writing or tracing of the alphabet letters, I have combined means in the device whereby the left hand is fully occupied during the writing or tracing operation; however, this can be changed so that either hand may be used.

My educational device embodies the utilization of a magnetic pencil which traces the letter indicia which is externally visible on the device, and the device is so constructed that if the child does not accurately follow or trace the letter indicia with the magnetic pencil, the completion of the tracing may not be accomplished and the tracing operation must be started again. In the preliminary teaching of a child to accomplish the learning processes provided by this device it is desirable to teach the learner how to correctly hold the magnetic pencil for the tracing operation. The instructor after explaining how to hold the magnetic pencil should show the learner how the tracing work is done and the learner will be motivated to successfully accomplish the tracing operation due partially to the fact that upon successful completion of the tracing a symbol will automatically be illuminated, and this obviously makes the learning task more in the nature of a game than a learning chore.

One of the many advantages which are inherent in this device is that the learner has the opportunity to learn the writing skills at his own learning rate, and the device has been shown to be fun and challenging in the operation thereof and definitely aids learners in the development of more legible writing skills.

The device of this invention is compact and rugged so that it may be used under normal conditions for indefinite periods and will require no maintenance with the exception of the occasional renewing of batteries powering the electric circuit which will be described hereinafter. Electric power other than batteries can be used.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a top plan view of the device.

FIG. 2 is a view similar to FIG. 1 with the top of the device removed.

FIG. 3 is a view taken on the line 3—3 of FIG. 2.

FIG. 4 is a view taken on the line 4—4 of FIG. 1.

FIG. 5 is a diametric view used with this educational device.

Figure 6:
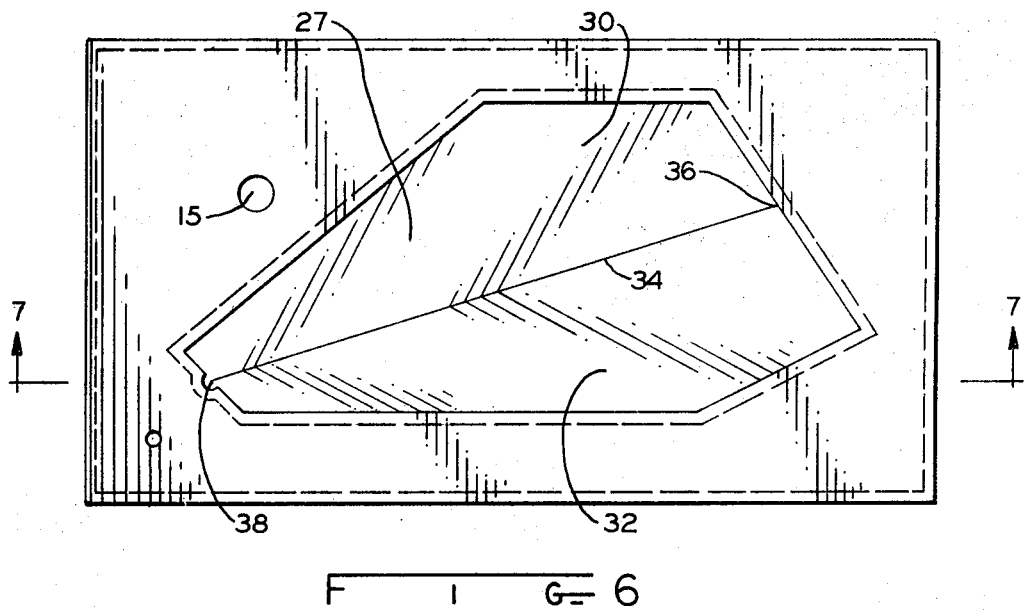
FIG. 6 is a top plan view of the device with the top removed in order to illustrate the base mounted therebelow.
Figure 7:
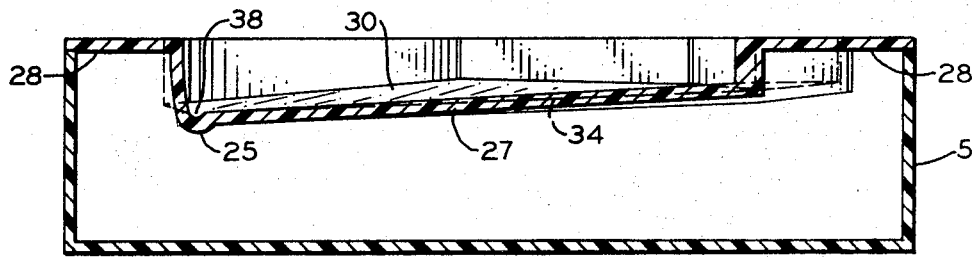
FIG. 7 is a sectional view taken on line 7—7 of FIG. 6.

In the accompanying drawings I have used the numeral 1 to designate, in its entirety, the housing of the device in which certain of the operating elements are mounted. The housing includes side walls 3, end walls 5 and a bottom 6. I provide a top 7 for the device which may be composed of plastic or any other suitable material through which magnetic energy will pass, for the purposes and in a manner to be hereinafter described. The top 7 extends over and covers the entire housing and may be mounted thereon by means of a clamping rectangular angular frame 8 which is caused to adhere to the sides and ends, 3 and 5, respectively, by any suitable means. Applied on the top 7, so as to be externally visible, is a letter of the alphabet which I have designated generally by the numeral 9. In this instance, purely by way of example and not as a limitation, I have illustrated the letter $a$ in script, such letter including a tracing commencement point 11 and a tracing completion point 13, the points 11 and 13 being connected by the lines forming the parts of the letter $a$. A symbol or object related to the particular letter is formed on the top 7 and in this instance comprises the representation of an apple 15. It will be appreciated, of course, that for the letter $b$ a symbol or representation of a ball might be used, and for the letter $c$, for instance, the representation or symbol of a cat, and so on. Below the symbol 15 is an illuminating means 17 in the form of an electric bulb, which, as will be explained, is automatically illuminated upon successful completion of the tracing.

Figure 8:
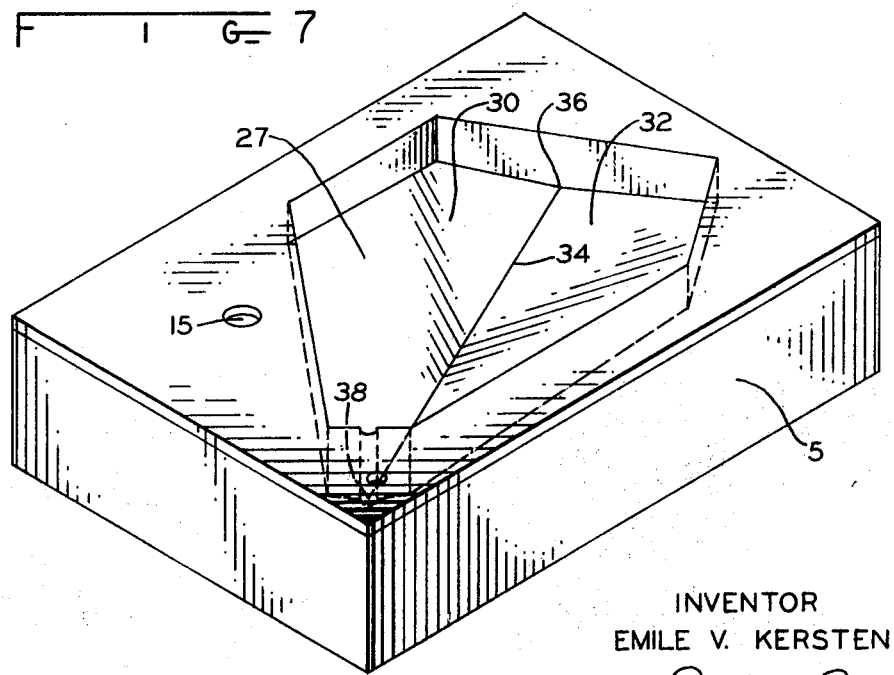
FIG. 8 is an isometric view illustrating the housing of the device and base, the top which extends over and covers the housing shown removed.

Mounted within the housing is what I shall term a base 19 which is formed of a material through which the magnetic attraction will not pass. The base 19 is mounted below and preferably, though not necessarily, in contact with the top 7 and may be cemented or otherwise caused to adhere to the under surface of the top. The base 19 is provided with a slot 21 therein and extending therethrough (see FIG. 4) and this slot 21 is configured in conformance with the outline of letter $a$, or other indicia 9, which is applied to the top 7 of the device. The top 7 and the base 19 are so related that each length or part of the slot 21 is in direct vertical alignment with a corresponding length or part of the letter 9. The end 23 of the slot 21, which corresponds to and is directly beneath commencement point 11, is bottomless to provide a communicating access duct 24 with the lowermost end 25 of a collection box 27 which is disposed below and in spaced relation with respect to the base 19. The collection box 27, as will be clearly apparent from consideration of FIG. 1, extends in spaced relation below all points of the slot 21 and the collection box 27 is inclined downwardly to the end 25. The collection box 27 as shown in FIG. 8 consists of two compound angle surfaces 30, 32 which intersect linearly at 34 so that in the event the ball 63 is disengaged, by magnetic decoupling from pencil 61, the ball when it drops downwardly, will, regardless of the point of disengagement strike the surface of 30 or 32 which, being inclined toward each other cause the ball to move under gravity toward the intersection line 34 and then owing to the downward pitch of line 34 generally from point 36 to point 38 will inevitably cause the ball to return to 38. At 38 the ball will then rise magnetically to a point corresponding to the initial starting point 23 of the slot 21 which corresponds to and is directly beneath the commencement point 11. The slot 21 is provided with a vertically disposed communicating duct 29 which communicates with the collection box 27 and this duct 29 is disposed directly below the completion end 13 of the letter 9. It is to be recognized that the entire slot 21 extends entirely through base 19 for a purpose to be hereinafter described. Consideration of the drawings shows that the collection box 27 may be mounted in operative position in the housing by means of flanges 28 which rest on the top edges of the sides and ends of the housing.

As I have pointed out above the educational device employs means therein which must be operated during the tracing operation by the left hand of the learner. This results in forcing the learner to use his right hand rather than his left hand for the tracing operation. In order to accomplish this purpose I provide a button 31 mounted on the upper end of a stem 33 to extend upwardly through the flange 28, and the top 7 on the left hand side of the device, as is clearly illustrated in the drawings. The button is biased upwardly by means of a spring 35 and the stem 33 extends downwardly into the housing and through a guide bracket 37. Fixed to the bottom 6 of the housing is an upstanding supporting bracket 39 to which is pivotally affixed a V-shaped link arrangement designated generally by the numeral 41 which comprises a pair of arms 43 and 45, the arm 45 having a slot 47 at one end thereof into which slidably extends a lug 49 which is fixed on the lower end of the stem 33. Pivotally fixed to the upper end of the arm 43 is an actuating arm 51 which extends transversely within the housing and a link 53 is pivotally mounted on the end of the arm 51 which is opposite to the arm 43. The link 53 operates in a guide arrangement 55 which extends inwardly from the respective end 5 of the housing. Fixedly mounted adjacent the end of the link 53 is a generally upwardly extending arm 57 having what I shall term a sliding lock or closure member 59 extending inwardly of the housing therefrom and slidably through a slot which is formed in the collection box 27. The purpose of the arrangement just described will be explained hereinafter. If this philosophy is not adopted, the button 31 can be placed in another position on the top of the housing so that either hand can be used.

I provide a magnetic pencil 61 for each learner operating the device, and a steel ball 63 at the initiation of the tracing operation is positioned in the lowermost end or well 25 of the collection box which, as has been stated, is below the commencement point 11 of the letter or object being traced.

Batteries 65 are positioned in any desirable location within the housing and are electrically connected to the illuminating means 17 by means of conductors 67 and 69. A normally open electrical switch 71 is inserted in the electrical conductor 69, this switch 71 being closed by the steel ball 63 when the learner has successfully traced the entire courses of the letter or other object being traced. By the use of a transformer, the unit can use normal house current.

In the operation of my educational device the learner first depresses the button 31 which, through the linkage arrangement described, projects the sliding lock 59 through the wall of the collection box 27 and into position wherein the sliding lock 59 closes the return or vertically disposed communicating duct 29 so that the steel ball will be maintained in position in the duct 29 if the tracing of the letter is successfully completed. It will thus be evident that during the tracing operation the learner's left hand or right hand is necessarily employed to depress the button 31. Following depression of the button 31 the magnetic pencil 61 is grasped by the learner in his right hand or left hand and the point thereof is positioned on the commencement point 11 of the letter of the alphabet or other object. With the magnetic pencil so placed the steel ball is attracted upwardly from its position in the well 25 through the duct 24 and into the end 23 of the slot 21 which is the commencement position for the tracing operation. The magnetic pencil is then moved by the learner in the tracing operation along the various strokes or courses of the letter 9 and if the magnetic pencil is not lifted from the letter indicia or does not deviate laterally from the courses of the letter indicia and follows such courses in accordance with the arrows to the completion point 13, the steel ball will follow the travel of the magnetic pencil in slot 21 and at the completion of the tracing the ball will fall into the end duct 29 and will be maintained in that position by the sliding lock 59 and the steel ball in the duct 29 will close the switch 71 to complete the circuit for the energization of the illuminating means 17 so that the apple symbol 15 will likewise be illuminated to indicate to the learner that he has successfully completed the tracing operation. When the representation 15 has been illuminated to indicate successful completion of the tracing operation the learner's left hand or fingers or right hand or fingers are removed from the button 31 which under the action of the spring 35 is projected upwardly and through the linkage arrangement the sliding lock 59 is withdrawn from its duct closing position thereby permitting the ball to fall through the slot and into the collection box and to the well 25. In the event that the child, in the tracing operation, lifts the magnetic pencil from the courses of the letter or other object or permits the pencil to deviate laterally therefrom the magnetic attraction on the steel ball will be lost and the ball will drop downwardly out of the slot into the collection box 27 and by gravity will return to the well 25 and the child will try again to successfully trace the letter or other object.

It is within my contemplation to provide a plurality of these devices which may be combined into a single unit. For instance, in this manner one unit could embody several letters of the alphabet so that when the child had successfully completed the letter *a* he would move onto the letter *b* and so forth, and it will be appreciated that in this combination of several devices they would all be connected together in any suitable manner and each device of the entire unit would involve the elements and operational features which have been hereinabove described.

It will be recognized that instead of the illumination of the visible symbol 15 an audible indication of successful completion of the tracing could be used and still fall within the spirit and scope of my invention.

I claim:

1. An educational device comprising a housing having a top including a course which is in the configuration of a letter or other figure to be traced and learned by the user of the device, a movable member located within said housing, and a writing instrument having a point which is magnetically coupled with said movable member which is adapted to be moved at the subsurface of said cover and along the course forming the letter configuration and to remain in magnetically coupled relation as the instrument traces the configuration, said movable member being decoupled when the instrument deviates from the course at any point of the deviation along the length of the course to effect dropping of the movable member, a collection means within said housing having compound inclined surfaces providing a linear intersection for receiving and directing the fall of the movable member along a prescribed linear path, and guide means at the terminal part of said linear intersection for directing the path of said movable member upwardly and located at the starting position of said course whereby error at any point in deviation from said course will cause an automatic return of said movable member to the starting position.

2. An educational device in accordance with claim 1 including an electric circuit, a power source therefor, signalling means disposed in said housing and electrically connected in said electric circuit, and normally open electric switch means in said electric circuit controlling the energization of said signal, said normally open electrical switch means being disposed at the completion point of said course and being closed by said movable member when it reaches said completion point.

3. An educational device in accordance with claim 2 wherein said circuit includes an illuminable element within said housing, and adapted to be illuminated when the electrical circuit is completed by said movable means.

4. Educational device in accordance with claim 1 wherein said movable member comprises a steel ball.

5. The educational device in accordance with claim 1 wherein said top is nonmagnetic material.

6. The educational device in accordance with claim 1 including manual actuating means disposed exteriorly of said housing and accessible to either hand of the user, and for mechanically holding said movable member at the terminal point of said course.

7. A method for teaching script writing comprising the steps of magnetically coupling an instrument and a movable member which are moved in unison through tracing movements through a course corresponding to the letter or other representation to be learned, decoupling the magnetic connection at any point of deviation along the prescribed course to signal an error occurrence, collecting the movable object at whatever point of decoupling and directing such moving member by gravity along a prescribed linear course to the starting point to provide for a recoupling and removement through said course.

* * * * *